United States Patent [19]

Lass

[11] 4,163,501
[45] Aug. 7, 1979

[54] ELECTRICAL OUTLET BOX AND WALL MOUNTING CLAMP THEREFOR

[75] Inventor: John L. Lass, Homewood, Ill.

[73] Assignee: Square D Company, Park Ridge, Ill.

[21] Appl. No.: 913,178

[22] Filed: Jun. 6, 1978

Related U.S. Application Data

[63] Continuation of Ser. No. 837,955, Sep. 29, 1977, abandoned.

[51] Int. Cl.² .............................................. H02G 3/08
[52] U.S. Cl. .................................. 220/3.6; 24/73 PF; 24/208 A; 174/58; 220/3.9
[58] Field of Search ................. 220/3.3, 3.6, 3.5, 3.92, 220/3.94, 3.7, 3.9; 24/217, 73 PF, 208 A; 174/58, 63, 54; 248/DIG. 6

[56] References Cited

U.S. PATENT DOCUMENTS

| | | | |
|---|---|---|---|
| 1,567,863 | 12/1925 | Sargent et al. | 220/3.9 X |
| 2,039,550 | 5/1936 | Norton | 220/3.6 |
| 2,044,650 | 6/1936 | Thompson | 220/3.6 |
| 2,063,923 | 12/1936 | Gries | 220/3.6 |
| 2,130,839 | 9/1938 | Conners | 220/3.6 |
| 2,286,898 | 6/1942 | Cover | 220/3.6 |
| 2,299,696 | 10/1942 | Gregersen | 220/3.6 |
| 2,531,698 | 11/1950 | Petrick et al. | 220/3.6 |
| 2,838,821 | 6/1958 | Shur | 24/217 |
| 2,879,912 | 3/1959 | Appleton | 220/3.9 |
| 2,885,106 | 5/1959 | Miller | 220/3.6 |
| 2,901,796 | 9/1959 | Hope | 24/217 X |
| 3,155,808 | 11/1964 | Wily | 24/217 X |
| 3,276,834 | 10/1966 | Greenwald et al. | 220/3.5 X |
| 3,575,313 | 4/1971 | Trachtenberg | 220/3.3 |
| 3,710,972 | 1/1973 | Barry | 220/3.6 |
| 3,848,764 | 11/1974 | Salg | 220/3.6 |
| 4,069,448 | 1/1978 | Gernhardt | 174/58 X |

*Primary Examiner*—Allan N. Shoap
*Attorney, Agent, or Firm*—Carmen B. Patti

[57] ABSTRACT

An electrical outlet box and wall mounting clamps therefor for connection to a wall panel. The clamps comprise a pair of L-shaped members each having a first leg which forms a clamping wall and second leg extending from the first leg at slightly more than a 90° angle. The clamps are mounted by inserting the first leg through an elongated transverse slot in the top and bottom walls of the outlet box. The clamps pivot between a retracted position for insertion of the outlet box through a corresponding aperture in a wall panel and a clamping position for connecting the outlet box to the wall panel. Each clamp is held in the retracted position by an over-center spring lock. Snap buttons on the second leg of each clamp fit into respective apertures in the outlet box when the clamps are in the clamping position.

4 Claims, 10 Drawing Figures

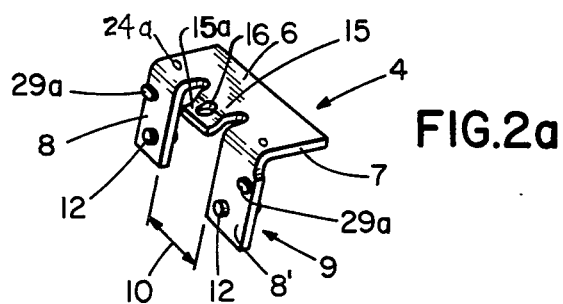
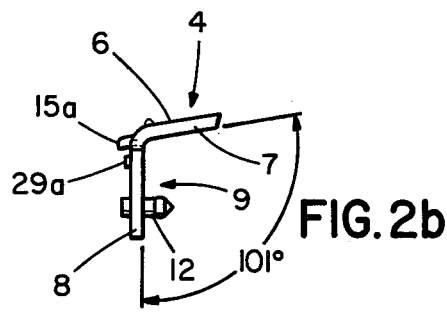
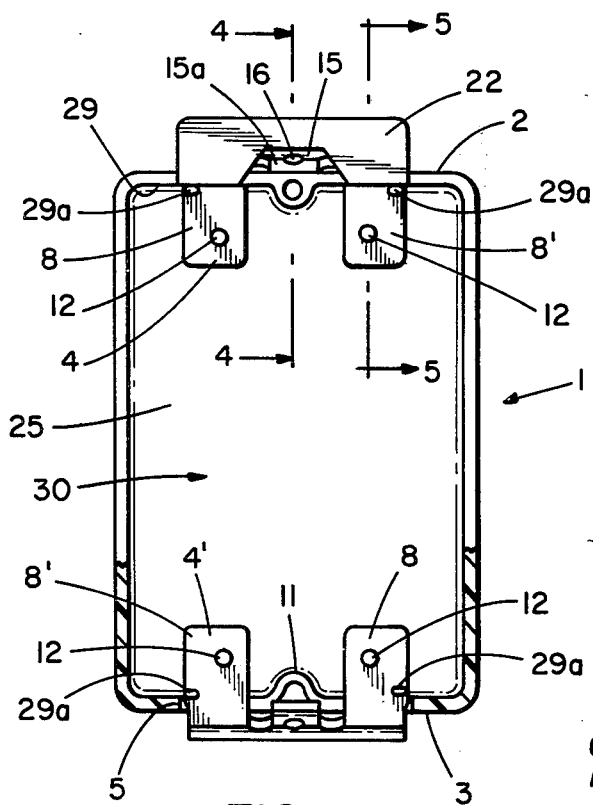
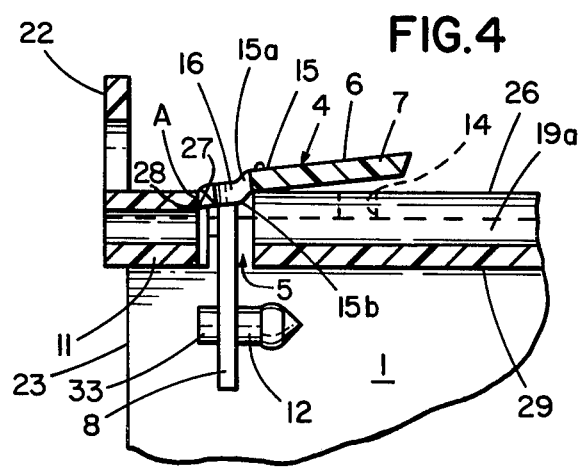
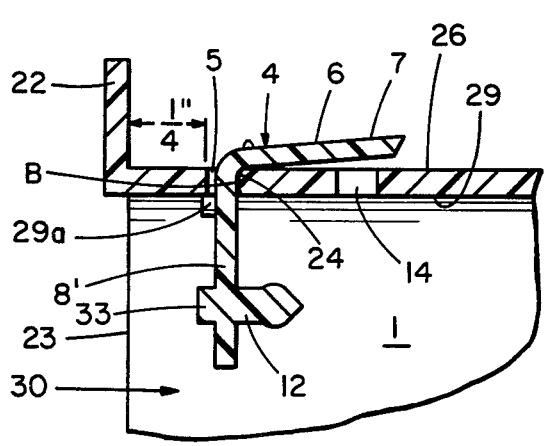
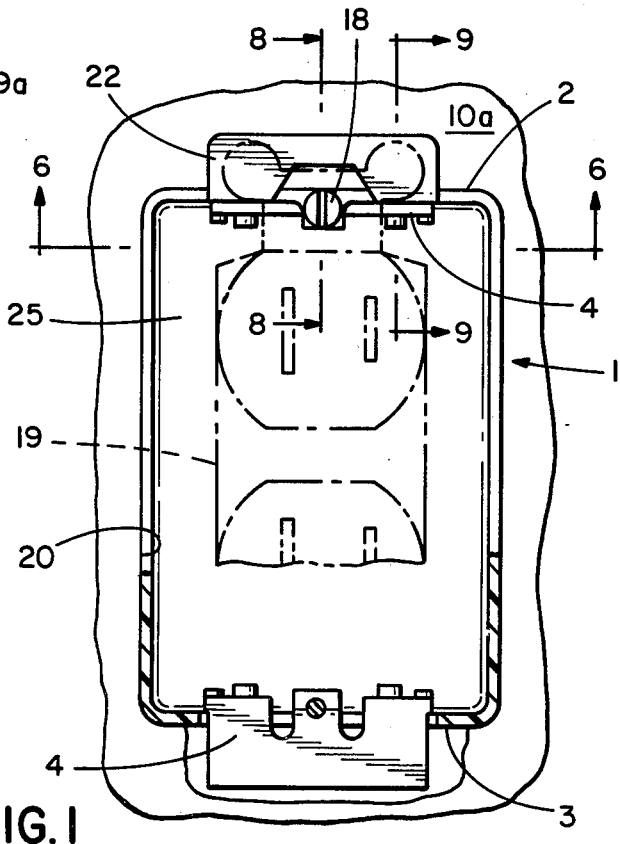

ELECTRICAL OUTLET BOX AND WALL MOUNTING CLAMP THEREFOR

This is a continuation of application Ser. No. 837,955, filed Sept. 29, 1977, now abandoned.

BACKGROUND OF THE INVENTION

This invention relates to the field of electrical outlet boxes having self-contained clamping means to mount and secure the boxes in corresponding apertures provided in a wall panel of a structure (such as a house or mobile home) in preparation for wiring for electrical service.

For many years, outlet boxes were secured to studs and other portions of a building wall by nails or screws, and many are still secured by this method. In certain types of building construction such as pre-fabricated housing, manufacture of mobile homes and the like, assembly line techniques are employed which lend themselves to time and labor saving techniques. Thus, various self-contained clamping devices have been incorporated into electrical outlet boxes to enable securing the box in place in an aperture in a wall panel without the need for using screws or nails driven into the studding framework. Among such self-contained clamping devices are winglike members mounted on a frontal access screw to rotate upon rotation of the screw from a folded position along a side of the box after the box has been inserted in a receiving aperture in a wall panel to an extended position wherein the winglike member extends outwardly from the side of the box to sandwich an edge of the wall panel between such member and a frontal flange of the box. Such clamping devices rotate on an axis which is normal to the open front wall of the outlet box and normal to the wall panel in which the outlet box is being secured. The bearing surface of such devices which faces the front of the box remains the same both in the folded position against the side of the box and in the extended position when rotated outwardly to bear against the rear surface of the wall panel after the box has been inserted in the aperture in the wall panel. If this front facing bearing surface is made relatively broad for good clamping contact when in the extended position, the device will not clear when the box is inserted into the receiving aperture. If the front facing bearing surface is made narrow enough to clear when inserting the box in the receiving aperture in the wall panel opening, it provides only minimal clamping contact when rotated outwardly from the side of the box to its extended position. Accordingly, when using this type of device it is customary to provide one such device in each corner of a rectangular outlet box in order to provide some degree of stability to the box when installed.

Other attempts to provide self-contained clamping devices for electrical outlet boxes have included forming integral ears or clamping surfaces as outward projections from wall portions of the outlet box, with a cam surface positioned to contact a corresponding wall panel edge bounding the aperture in the wall panel as the box is pushed into such aperture to flex the integral ears or clamping surfaces inwardly until they are pushed beyond the rear surface of the aperture of the wall panel whereupon they are supposed to spring back to bear against such rear surface and clamp the box in place with the wall edges held between such clamping surfaces and frontal flanges of the box. This type of self contained device requires the use of materials capable of flexing the clamping surfaces inwardly when the box is being inserted and springing back when fully inserted. When used with metal boxes, the cammed ears must be relatively thin to enable them to flex inwardly when the box is pushed in the aperture in the wall panel, thus limiting the area of bearing surface available to clamp against the rear surface of the wall panel. When this type of device is used with various types of plastic outlet boxes, the cammed ears do not always return to the fully extended position and hence do not provide a satisfactory clamping surface.

The present invention overcomes the problems associated with such prior art self-contained clamping devices. The L-shaped clamp members described herein pivot between retracted and clamping position on an axis which is parallel to the open front wall of the box and to the surface of the wall panel in which the box is mounted. This enables the use of the clamp which has a relatively broader bearing surface than devices which rotate on an axis normal to the surface of the wall in which the box is mounted. A more secure clamp of the box to the wall panel can thus be achieved, and with fewer clamp devices thus reducing cost.

SUMMARY OF THE INVENTION

It is an object of the invention to provide an electrical outlet box having wall mounting clamps which are pivotable between a retracted position and a clamping position.

It is an object of the invention to provide an electrical outlet box having wall mounting clamps which can be manually connected to a wall panel without the use of tools or other mechanical devices.

It is an object of the invention to provide an electrical outlet box having wall mounting clamps which are self-contained and carried by the outlet box in a retracted position for insertion of the box in an aperture of a wall panel and for thereupon pivoting said clamps to a clamping position to secure said outlet box to said wall panel.

It is an object of the invention to provide an electrical outlet box having wall mounting clamps pivotally mounted in the top and bottom walls of a rectangular outlet box, the clamps each comprising an L-shaped member including a clamping wall as one leg of the L-shaped member extending exteriorly of the box and a pair of spaced apart projections as the other leg of the L-shaped member extending interiorly of the box.

It is an object of the invention to provide an electrical outlet box having wall mounting clamps pivotally rotated through a slot which is parallel to the open front wall of the outlet box and to the surface of the wall panel when said outlet box is mounted therein.

It is a further object of this invention to provide an electrical outlet box having a wall mounting clamp which is secured in the retracted position for ease of mounting in an aperture of a wall panel.

It is a further object of this invention to provide an electrical outlet box which translates bending forces to shear forces to secure the clamp in the clamped position to the wall panel.

A still further object of the invention is to provide a secondary locking means to maintain the connection to the wall panel in the event the clamp becomes detached from the clamped position.

The wall mounting clamp provided for the electrical outlet box of this invention is disposed in a slot which is parallel to the front wall of the outlet box. The clamp is pivotable from a retracted position to a clamping position through the slot. In the retracted position, an over-center snap lock with a stop is provided to insure that the clamp does not move away and become detached from the outlet box during the process of shipping and installation. The clamp has two legs which are disposed obtuse angle, and in the clamping position the legs are resolved to a substantially 90° relationship whereby the bending forces applied to a first leg of the clamp as it is pushed up against the mounting wall are translated into shear forces at the point of contact between the clamp and the slot. In the clamping position, snap plugs on the other leg of the clamp hold a second leg to an inner wall of the outlet box. A secondary locking means is provided by a screw which connects the receptacle to the outlet box. The screw also extends through the leg which abuts the wall panel, and, in the event that the leg connected to the wall panel of the outlet box becomes detached, rotation of the leg would be restricted over a limited distance, and the box would not become detached from the wall panel.

These and other objects, features and advantages of this invention will become apparent from the following description and drawings.

BRIEF DESCRIPTION OF THE DRAWINGS

FIG. 1 is a front elevation of an electrical outlet box in accordance with this invention in partial cross section with a receptacle in phantom having wall mounting clamps pivotally mounted in the top and bottom walls shown in their clamping position;

FIG. 2a is a perspective view of the mounting clamp;

FIG. 2b is a side view of the mounting clamp;

FIG. 3 is a front elevation of an electrical outlet box in accordance with this invention in partial cross section having wall mounting clamps pivotally mounted in the top and bottom walls shown in their retracted position;

FIG. 4 is a section view taken along lines 4—4 of FIG. 3;

FIG. 5 is a section view taken along lines 5—5 of FIG. 3;

DETAILED DESCRIPTION OF THE INVENTION

Figure 6:
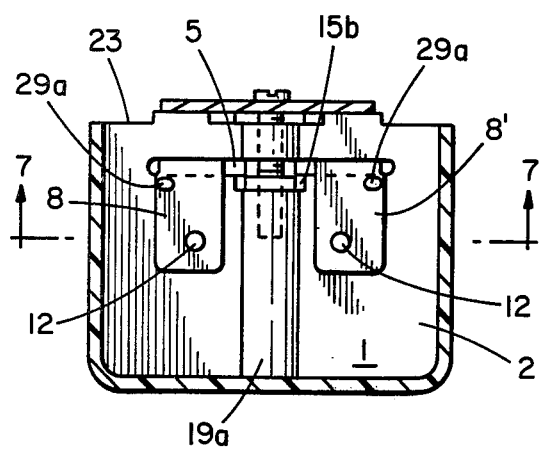
FIG. 6 is a section view taken along line 6—6 of FIG. 1.

Referring to the drawings, an electrical outlet box 1 includes a top wall 2 and a bottom wall 3 in which a pair of wall mounting clamps 4 an 4' are mounted respectively through elongated slots 5 extending transversely through each of the walls 2 and 3.

As best seen in FIGS. 2a and 2b, the wall mounting clamps 4 and 4' are L-shaped members. They are identical, as are the walls 2 and 3, so only one clamp and wall will be described in detail.

Figure 8:
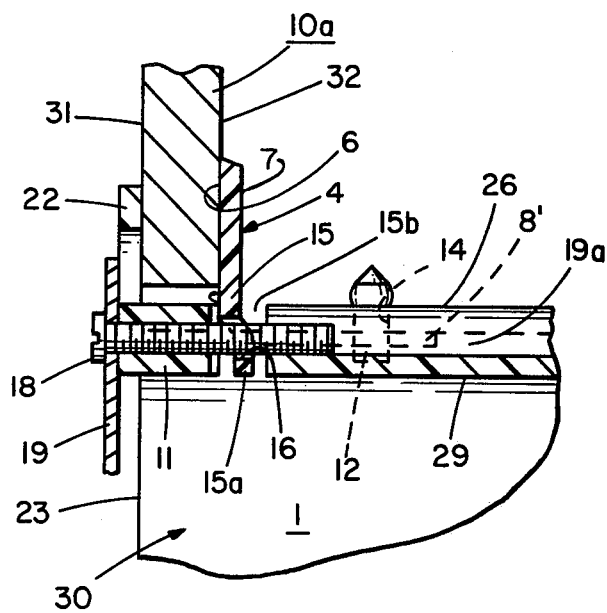
FIG. 8 is a section view taken along line 8—8 of FIG. 1.
Figure 9:
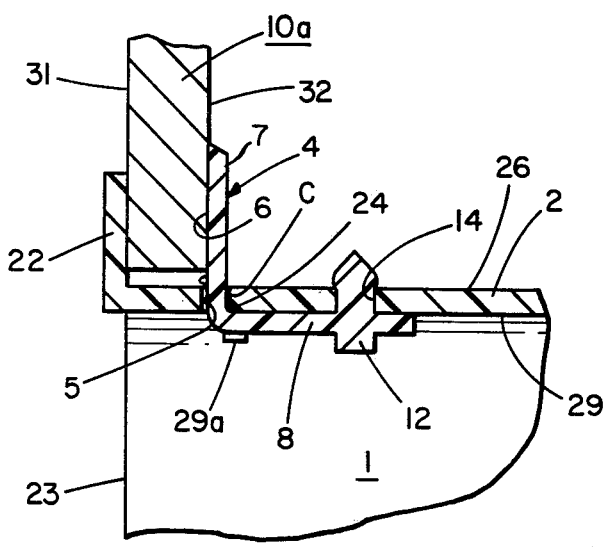
FIG. 9 is a section view taken along lines 9—9 of FIG. 1.
Figure 7:
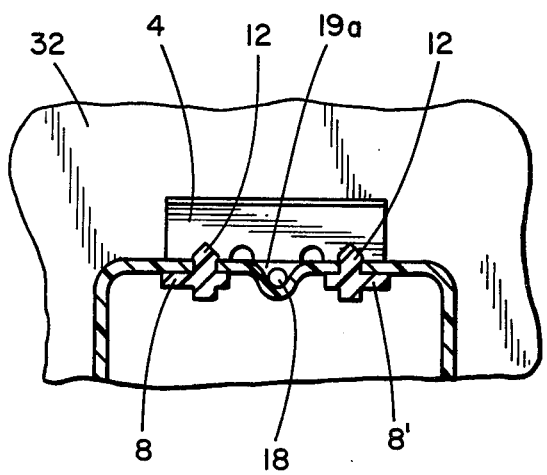
FIG. 7 is an inverted section view taken along lines 7—7 of FIG. 6.

The clamp 4 includes a clamping wall 6 as a first leg 7 of the L-shaped member, and a pair of spaced apart projections 8 and 8' comprise a second leg 9 of the L. The first leg 7 is at a slightly greater than 90° angle, preferably 101°, to the second leg 9, which, as best seen in FIGS. 8 and 9, stresses the clamping wall 6 against the inner surface of a receiving wall panel 10a when the outlet box 1 is inserted therein and the clamp members 4 and 4' are moved to their clamping position. As best seen in FIGS. 8 and 9, the legs are resolved to a substantially 90° relationship to each other in the clamped position.

As shown in FIG. 2a, a clearance gap 10 is provided between the spaced apart projections 8 and 8' of the second leg 9. A center post 11 of the top wall 2 and the center post of the bottom wall 3 (not shown) lie in the gap 10 between projections 8 and 8' when the clamp member 4 is moved to its clamping position.

Each projection 8 and 8' has a primary locking means which includes near the free ends thereof a snap button comprising a short lug 12 having an enlarged head 13. When the clamp member 4 is moved to its clamping position, the enlarged head 13 of each lug 12 is received in a corresponding locking aperture 14 positioned in the top wall 2 for registration with lugs 12 when said clamp is moved to said clamping position. The enlarged head 13 is compressed when it enters its respective aperture 14 and when pushed through aperture 14 the enlarged head 13 expands to its original dimension thus locking the clamp member in the clamping position.

The first leg 7 of the clamp members 4 and 4' includes a central appendage 15 having a step-down end portion 15a and a central aperture 16 therethrough. The appendage 14 has a step-down end portion 15a which is received in the rearward extension 15b of the slot 5, as shown in FIGS. 4 and 6. The central aperture 16 of each clamp is in registration with internally threaded bore 17 through center post 11 when clamp 4 is moved to its clamping position.

Mounting screws 18 which secure a wiring device in place, such as duplex receptacle 19 as shown in FIGS. 1 and 8, are threaded through bore 17 and extend through the central apertures 16 of the clamp member 4 when it is in the clamping position. The aperture 16 is not threaded and is slightly larger than the diameter of the mounting screw 18. When the mounting screw 18 is extending through the aperture 16, it is received by a channel 19a disposed in wall 2 and extending rearwardly from the extension 15b. When the clamp member is positively locked in place in the clamping position to securely mount the outlet box 1 in the receiving aperture of the wall panel 10a, the wall panel 10a is sandwiched between the clamping wall 6 of clamp members 4 and frontal flange 22 which extends laterally from a front edge 23 of the top wall 2.

In operation, the outlet boxes 1 are installed as follows. Clamp 4 and top wall 2 are described below, but the operation for clamp 4' and the bottom wall 3 is identical.

The clamp 4 is connected through the elongated slot 5 in the top wall 2 of the outlet box 1 and positioned in the retracted position, preferably by the manufacturer before shipment.

The slot 5 is parallel to the open front wall 25 of the outlet box 1. The slot 5 is selectively spaced inwardly from the front edge 23 a distance which is equal to or slightly greater than the width of the wall panel 10a in which the outlet box is to be mounted. Dimensions of $\frac{1}{4}''$, $\frac{3}{8}''$ and $\frac{1}{2}''$ from the front wall are used for wall panels having a thickness of $\frac{1}{4}''$ to 3/16", 5/16" to $\frac{3}{8}''$ and 7/16" to $\frac{1}{2}''$, respectively. A dimension of $\frac{1}{4}''$ is shown in FIG. 5.

More specifically the connection between the clamp 4 and the wall 2 is accomplished by inserting the first leg 7 through the slot 5 from the bottom side until a pivot junction or junction line 24, which joins the first leg 7 and second leg 9 of the L-shaped clamp 4, reaches the slot 5. The bosses 29a extend laterally from a forward side of the first leg portion 7 near the junction line 24. The bosses 29a are selectively sized to allow the leg portion 7 to be pushed through the slot 5 and then prevent the leg portion 7 from moving back through the slot 5 in the event the clamp 4 is jarred or shaken loose during shipment or installation.

When the junction line 24 of the clamp 4 is near the lower edge of slot 5, the clamp 4 is then pivoted to the retracted position so that the junction line 24 is above the top edge of the slot 5 and leg 7 lies against an outer surface 26 of top wall 2, as best seen in FIGS. 4 and 5.

In the retracted position, as shown in FIG. 4, a free edge 27 of the step-down portion 15a of the central appendage 15 bears against a corresponding edge 28 at point A of slot 5. The contact of the free edge 27 against the corresponding edge 28 is slightly above a contact point B of the inner side of the second leg to the inner side of the slot 5, as shown in FIG. 4, creating a over-center switch action with the bearing at point A exerting a force on the corresponding edge 28, thus providing a clockwise movement about a fulcrum at point B, thus holding the clamp 4 in its retracted position.

As best seen in FIG. 4, a boss 29a on the second leg also acts as a stop means to prevent movement of the clamp outwardly from the wall 2 when the clamp 4 is in the retracted position.

The respective corresponding edges 37 of central appendage 15 is preferably rounded slightly forming a cam surface to enable free edge 27 of central appendage 15 to cam against corresponding edge 28 of the slot 5 when the clamp 4 is pivoted from the retracted position to the clamping position. When cammed against the edge 28 the clamp may pivot to its clamping position. In such clamping position, the clamping wall 6 of leg 7 extends upright from the top wall 2. The projections 8 and 8' of the second leg 9 of the L-shaped clamp member then lie against the inner surface 29 of top wall 2 with the respective lugs 12 of projections 8 and 8' being lockingly received in their corresponding apertures 14. If the clamp 4 is moved to the clamping position without a wall panel present, the clamping wall 6 will be oblique to the rear surface of frontal flange 22.

In the retracted position of clamp 4, as seen in FIGS. 4 and 5, the first leg 7 lies against the outer surfaces 26 of the wall 2, and the projections 8 and 8' of the second leg 9 of the L-shaped clamp member 4 at such time extend inwardly into the cavity 30 of the outlet box 1.

The outlet boxes are preferably furnished to the job site with the clamps 4 and 4' mounted therein in their retracted position. The boxes may then be inserted in a pre-cut receiving aperture 20 of wall panel 10a from the front side 31 of said wall panel. The first leg 7 of the clamp 4 lying flat against the top wall 2 of the outlet box 1 is able to clear the edges of the aperture 20 as the box is pushed therein until the front side 31 of the wall panel 10a abuts against the fontral flanges 22 of the outlet box 1. At such point, pressure is applied from the front against the projections 8 and 8' of clamp member 4 which in the retracted position are extending inwardly of the box cavity 30, thus causing the clamp member 4 to pivot until it reaches the clamping position. As the clamp is pivoted through the slot the clamping wall 6 of the first leg 7 contacts the inner side of the wall panel 10a commencing at a point near the surface 26, and, as the rotation of the clamp is continued, the area of surface contact increases between the clamping wall 6 and frontal flange 22 until the entire surface of wall 6 abuts the flange 22, as best seen in FIGS. 8 and 9. As the clamp is rotated to the clamped position, the clamp is subjected to bending forces. However, when the locking is completed, the clamp is resolved into substantially a 90° relationship between the legs and the bending forces are at least partially translated into shear forces which occur at the point of contact C between the rear side of leg 7 and the rear edge of slot as shown in FIG. 9.

In the clamping position, additional manual pressure is applied against the projections 8 and 8' of the second leg 9 until their respective lugs 12 are lockingly seated in their respective aperture 14.

The projections 8 and 8' of the second leg 9 are at such time parallel with the respective wall of the outlet box in which the clamp 4 is mounted, and the clamping wall 6 is in bearing engagement against the inner surface 32 of the wall panel 10a. Since the clamping wall 6 of first leg 7 is at a slightly greater than 90° angle to the second leg 9, the clamping wall 6 becomes stressed and flexes slightly when forced against the inner surface 32 of wall panel 21 when the clamp 4 is locked in its fully clamped position. Such angle is preferably 101° as shown in FIG. 2b.

To further secure the clamp 4 in place, the central aperture 16 of central appendage 15 of the first leg 7 is in registration with the internally threaded bore 17 of center post 11 of the outlet box when in the fully clamped position, to receive the shank of mounting screw 18 therethrough when a wiring device is secured to the outlet box 1. In the event the clamps are disengaged from the clamping position, the apertures will rotate about the pivotal axis and the screw 18 will permit only a limited amount of rotation inasmuch as the screws will become engaged with the wall of the channel 19a. This relationship provides a secondary clamp and prevents the outlet box from becoming detached from the wall panel 10a.

In like manner clamp 4' in bottom wall 3 is then moved from its retracted position to the fully clamped position to clamp and lock the opposite end of the outlet box 1 to the corresponding edge of wall panel 10a.

The outlet box shown and described herein has the clamp 4 and 4' in the top wall 2 and bottom wall 3. It is understood that the clamp member can be mounted at other positions of the peripheral walls of the outlet box, such as in the side walls of the box if desired. The application is not to be limited to the particular locations illustrated and described herein.

The lugs 12 are press-fitted in corresponding apertures in the projections 8 and 8' of the second leg 9 of the L-shaped clamp 4, in such a way that an end portion 33, as shown in FIGS. 4 and 5, of the lug 12 extends through the projections 8 and 8' to the opposite side as shown in FIG. 6. Such extending end portion serves as a stop for a workman's thumb-nail, for example, when pushing the L-clamp 4 from a retracted position to a clamping position.

The outlet boxes and self-contained wall mounting clamps in accordance with this invention may be either metallic or nonmetallic.

As shown by the description of the invention above, a novel feature of the structure of the invention is that it allows the electrical outlet box to be connected to a wall panel using solely the manual efforts of a workman without resorting to tools or other mechanical devices for assistance.

I claim:

1. A clamp for use with an electrical outlet box, said clamp receivably located in an elongated slot in a wall of said outlet box, said clamp comprising;

a first leg outside of said outlet box and a second leg inside of said outlet box, said second leg consisting of a pair of spaced apart projections, said first and second legs being connected at a juncture and forming an initial predetermined angle slightly greater than 90 degrees, said clamp being in a first position before said outlet box is installed in a predetermined opening in a house wall, said first leg being substantially parallel and adjacent to said outlet box wall and extending toward said rear wall of said outlet box, said second leg extending into said outlet box, a central appendage connected to said first leg of said clamp near said juncture, said central appendage having a step-down end portion with a central aperture, a pair of snap buttons located on the end of said second leg opposite said juncture of said first and second legs, a snap button being located on each of said pair of spaced apart projections, for mating with a pair of apertures in said outlet box wall, such that after said outlet box is positioned in the predetermined opening in the house wall, said clamp is manually moved to a second position by pivoting said first and second legs about said juncture in said elongated slot until said snap buttons on said second leg are located in said corresponding apertures in said outlet box wall, said first leg effectively sandwiching the house wall between said second leg and a frontal flange, extending laterally away from a front edge of said outlet box wall, thereby securing said outlet box in the house wall, and an internally threaded bore in a center post extending inwardly from said front edge of said outlet box wall and a mounting screw, such that when said clamp is in said second position, said central aperture and said threaded bore are in registration, and when said mounting screw is inserted in said threaded bore, said mounting screw extends through said central aperture of said step-down portion of said central appendage thereby substantially retaining said clamp in said second position.

2. The apparatus defined in claim 18 wherein said step-down end portion has an end which defines a first contact point with a first wall portion of said slot in said outlet box wall and wherein a second contact point is defined by the inner side of said second leg and a second wall portion of said slot, said first contact joint being above said second contact point thereby creating an over-center switch effect for retaining said clamp in said first position until manual force is applied to said clamp.

3. An improved electrical outlet box having top and bottom outlet box walls, side walls, and a rear wall, said top and bottom outlet box walls each having a frontal flange extending laterally away from a front edge thereof, the improvement for each of said top and bottom outlet box walls of said electrical outlet box comprising:

an elongated slot in said outlet box wall spaced inwardly a predetermined distance from said front edge and located parallel to said front edge, a clamp receivably located in said elongated slot, said clamp having a first leg outside of said outlet box and a second leg inside of said outlet box, said second leg consisting of a pair of spaced apart projections, said first and second legs being connected at a juncture and forming an initial predetermined angle, said clamp also having a central appendage connected to said first leg of said clamp near said juncture, said central appendage having a step-down end portion with a central aperture, said clamp being in a first position before said outlet box is installed in a predetermined opening in a house wall, said first leg being substantially parallel and adjacent to said outlet box wall and extending toward said rear wall of said outlet box, said second leg extending into said outlet box, a primary locking means consisting of a pair of snap buttons located on the end of said second leg opposite said juncture of said first and second legs, a snap button being located on each of said pair of spaced apart projections, and a pair of apertures in said outlet box wall for receiving said snap buttons, such that after said outlet box is positioned in the predetermined opening in the house wall, said clamp is manually moved to a second position by pivoting said first and second legs about said juncture in said elongated slot until said snap buttons on said second leg are located in said corresponding apertures in said outlet box wall, said first leg effectively sandwiching the house wall between said second leg and said frontal flange, thereby securing said outlet box in the house wall, and a secondary locking means consisting of an internally threaded bore in a center post extending inwardly from said front edge of said outlet box wall, a mounting screw, and said central appendage on said clamp, such that when said clamp is in said second position, said central aperture and said threaded bore are in registration, and when said mounting screw is inserted in said threaded bore, said mounting screw extends through said central aperture thereby substantially retaining said clamp in said second position even if said first locking means becomes defective.

4. The apparatus defined in claim 3 wherein said step-down end portion has an end which defines a first contact point with a first wall portion of said slot in said outlet box wall and wherein a second contact point is defined by the inner side of said second leg and a second wall portion of said slot, said first contact point being above said second contact point thereby creating an over-center switch effect for retaining said clamp in said first position until manual force is applied to said clamp.

* * * * *

UNITED STATES PATENT AND TRADEMARK OFFICE
CERTIFICATE OF CORRECTION

PATENT NO. : 4,163,501

DATED : August 7, 1979

INVENTOR(S) : John L. Lass

It is certified that error appears in the above–identified patent and that said Letters Patent are hereby corrected as shown below:

Col. 7, line 50, change "18" to --1--.

Signed and Sealed this

Twenty-ninth Day of July 1980

[SEAL]

Attest:

SIDNEY A. DIAMOND

Attesting Officer

Commissioner of Patents and Trademarks